US006959078B1

(12) United States Patent
Eilbacher et al.

(10) Patent No.: US 6,959,078 B1
(45) Date of Patent: Oct. 25, 2005

(54) APPARATUS AND METHOD FOR MONITORING AND ADAPTING TO ENVIRONMENTAL FACTORS WITHIN A CONTACT CENTER

(75) Inventors: Robert Eilbacher, Port Washington, NY (US); Ted Lubowsky, Huntington, NY (US)

(73) Assignee: Verint Systems Inc., Woodbury, NY (US)

( * ) Notice: Subject to any disclaimer, the term of this patent is extended or adjusted under 35 U.S.C. 154(b) by 0 days.

(21) Appl. No.: 09/490,065

(22) Filed: Jan. 24, 2000

(51) Int. Cl.[7] .......................... H04M 3/22; H04M 3/523

(52) U.S. Cl. .............................. 379/265.03; 379/32.01; 379/265.06; 379/265.07; 379/265.09

(58) Field of Search ........................... 379/32.01, 32.02, 379/32.04, 35, 265.03, 265.04, 265.05, 265.06, 265.07, 265.08, 265.09

(56) References Cited

U.S. PATENT DOCUMENTS 5,185,780 A * 2/1993 Leggett ................. 379/265.08
5,465,286 A * 11/1995 Clare et al. .............. 379/32.04
5,499,291 A * 3/1996 Kepley .................. 379/265.06
5,757,904 A * 5/1998 Anderson .............. 379/265.06
6,058,163 A * 5/2000 Pattison et al. ........ 379/265.06
6,144,971 A * 11/2000 Sunderman et al. ........ 715/500
6,263,049 B1 * 7/2001 Kuhn ...................... 379/32.01
6,542,602 B1 * 4/2003 Elazar ................... 379/265.06

OTHER PUBLICATIONS

COMVERSE INFOSYS, "Ultra 7.0, System Level Requirements (Level C)," Feb. 23, 1999, pp. 1–48.

* cited by examiner

*Primary Examiner*—Harry S. Hong
(74) *Attorney, Agent, or Firm*—Staas & Halsey LLP

(57) ABSTRACT

A quality monitoring system is implemented within a communications contact center. All electronic data associated with incoming and outgoing communications is monitored and can selectively be recorded. The recording of the communications data is controlled by a set of recording rules. Environmental data associated with the operation of the contact center is also stored. Periodically, and on demand by contact center personnel and others, the recorded communications data and the stored environmental data are analyzed. The recording rules that are actively controlling the recording of the communications data and the environmental data can be dynamically changed in real time, based on the analysis. The system can also display various results of the analysis on a contact center-wide display, on individual contact center agents' workstation screens, and on supervisors' workstation screens. These displays can be a congratulatory message to an agent who has exceeded predetermined goals, can warn of an excessively long wait queue for a class of incoming communications, and can provide contact center environmental information for assisting with evaluating the quality of service being provided by the contact center.

21 Claims, 4 Drawing Sheets

APPARATUS AND METHOD FOR MONITORING AND ADAPTING TO ENVIRONMENTAL FACTORS WITHIN A CONTACT CENTER

CROSS-REFERENCE TO RELATED APPLICATIONS

The present invention relates to a concurrently filed application entitled Open Storage Portal Apparatus and Method to Access Contact Center Information, application Ser. No. 09/490,047, now abandoned, by Robert Eilbacher, et al., the contents of which are incorporated herein by reference. The present invention also relates to a concurrently filed application entitled Method and System for Analyzing Customer Communications With a Contact Center, application Ser. No. 09/490,068, by Robert Eilbacher, et al., the contents of which are incorporated herein by reference.

BACKGROUND OF THE INVENTION

1. Field of the Invention

The present invention relates generally to contact centers, such as telephone call centers that provide telephone response services to individual and business subscribers worldwide. More specifically, the invention relates to a computer-implemented system for monitoring and analyzing activity within a communication contact center and for providing information from the analysis to agents and managers within the contact center for improving quality monitoring.

2. Description of the Related Art

Telephone call centers are facilities for receiving incoming telephone calls and for responding to the calls by taking messages, interactively directing the caller to a preferred service or information provider, or providing advertising or informational messages on behalf of a sponsoring client. For example, a caller dialing in to the customer service department of a particular home appliance manufacturer may initially be presented with a recorded voice menu from which the caller may respond by entering the appropriate number on a telephone key pad for the desired department, service, or information. Such menus are included in automated attendant systems to provide multiple options to the caller to accommodate the anticipated needs or inquiries of each caller. The caller could also be queried to provided information, such as the caller's account number or the last name of a sought person. Such systems are known as Interactive Voice Response (hereinafter referred to as "IVR") systems. Both systems generally also offer the caller the option of speaking with a real person, in which case the call is often placed in a queue and answered by the first available agent. Systems for controlling the queuing and routing of such live calls to agents are known as Automatic Call Distribution (hereinafter referred to as "ACD") systems. Telephone call centers may be as simple as an alternative answering service for an individual during the hours the person is out of the office, in which case the individual can periodically contact the call center for messages. At the other end of the spectrum are call centers through which the caller can inquire about product information and ultimately order a product, charging the purchase to a credit account, all without ever having to enter a store. Call centers can also provide out-bound services in which the call center agents initiate calls to prospective customers and respond to earlier calls and inquiries. Such telephone call centers are generally described in U.S. Pat. No. 5,825,869 to Brooks et al., which is incorporated herein by reference.

As used herein, the term, "customer," refers to both the individual calling into the call center for information or to access the available services and the individual who is called by the call center. An "agent" is the call center individual responsible for answering the customer's inquiries and directing the customer to the appropriate individual, department, information source, or service as required to satisfy the customer's needs, regardless of whether the customer or the agent initiated the call. A "monitor" or "supervisor" is the individual responsible for listening to the conversation between the customer and the agent, either in real time or after the end of the call while using a recording of the call, to review the agent's performance and to improve the quality of the customer's experience. The monitor may be a call center employee or may be a third party individual responsible for monitoring agent and call center compliance with certain procedures and standards. A "client" is the individual or entity that contracts the call center to receive or initiate telephone calls on behalf of and directed to the individual or entity.

For simplicity, call centers are hereinafter described in terms of handling in-bound calls, even though they can also handle out-bound calls.

While large manufacturers, service providers, and information providers have staffed in-house call centers to respond to the inquiries of their customers and potential customers, third party telephone call centers have been established whereby calls to several target companies may actually ring and be answered within a third party call center for providing a response, rather than in the locations or offices of the companies themselves. The company the caller is desiring to contact is identified to the call center agent by the telephone number and/or menu response entered by the caller. As such, the call centers may be located thousands of miles away from the actual sought manufacturer or individual.

The monitoring of incoming calls, along with the verbal responses of the call center agents, is a well-known quality monitoring and enhancement practice within telephone call centers. The transactions are reviewed, and the agents being monitored are counseled to improve the quality of the service they provide to the customer. Additionally, some of the conversations are recorded to comply with the requirements certain agencies and businesses face regarding the recording and archiving of transaction information, e.g., stock market trades. The monitoring can occur in real time while the conversation or telephone contact is occurring, or the verbal data and information entered through the telephone key pads can be logged or stored for subsequent review. Such a system is disclosed in U.S. Pat. No. 5,914,951 to Bentley et al., which is incorporated herein by reference.

Specialized devices have been developed for the full-time and selective recording or logging of calls to a call center. Such an apparatus has been manufactured by Comverse Infosys, Inc. of Woodbury, N.Y., under the product name ULTRA. The ULTRA system provides for full-time recording of all calls, on-demand and event-driven-recording of calls for transaction verification (such as for sales centers), archival of voice data, and instant playback. The ULTRA equipment is installed within the call center, offers a variety of audio compression and archive storage options, and is accessible for audio data retrieval across a local area network (hereinafter referred to as "LAN"). Comverse Infosys, Inc. also markets its MENTOR software package for capturing call center data, including audio data and agent screen data, and for monitoring and scoring call center agents.

Referring now to FIG. 1, there is illustrated an exemplary telephone call center system.

Incoming telephone calls from customers 100 are received through the PSTN 50 and are processed by the PBX/ACD 102. The IVR portion (not shown) of the PBX/ACD 102 interacts with the customer to determine the nature of the call and the service or information requested by the customer. Although not shown in FIG. 1, the PBX/ACD 102 may include audio databases for directly responding to the customer's inquiries as entered by the customer speaking into his or her telephone or making entries through the telephone keypad. Should the customer indicate a desire to speak with an agent, the PBX/ACD 102 selectively routes the call to available agents operating workstations 104'. The conversations between the customers 100 and the agents are selectively recorded by the monitor module 106' and stored in the database 108'. While all conversations may be recorded in their entirety, typically only a small portion of the calls (e.g., 4–10%) are recorded to save space on the call center database 108'; and, of those recorded calls, only a portion of the conversation may subsequently be reviewed. In a rules-based recording system, such as the one shown in FIG. 1, the recording rules reside in a rules database 110' and control the recording of the conversations by the monitor module 106'. Personnel responsible for monitoring the calls may access the information stored on database 108' through their respective supervisor workstations 112' for evaluation of the performance of an agent at one of the workstations 104'.

The information gleaned from the telephone call is used by the supervisor or monitor to monitor the performance of the call center agents for identification of any possible training needs. However, the information gathered is limited to the audio conversation between the caller and the agent, any data entered by the caller through the telephone key pad, and the screen images viewed by the agent. Furthermore, while the subsequent monitoring can occur over a network, the monitoring agent must be set up with appropriate, often proprietary, equipment, speakers, software, and password access to monitor the activities of the call center agents across the network. In other words, the monitors and supervisors of the call center are usually restricted to locations where they can gain physical access to the call center's telephone center or local area network. Should the network be unavailable to the monitor or should the monitor encounter any difficulty with his or her network station 112' or software, the monitor is prevented from performing his or her monitoring responsibilities. Additionally, the amount of information available to the monitor is very limited and cannot fully recreate the complete environment experienced by the caller and the agent during the course of the telephone contact. As such, the monitor is restricted in thoroughly evaluating the performance of the agent and in completely understanding the experience of the caller during the telephone contact. Furthermore, the monitors must constantly oversee the activity within the call center and must manually adjust the recording of the communications data based on whatever the monitors may perceive to be a is problem. Finally, the agents and supervisors have little perception regarding how they are performing and how the call center is functioning based on the amount of calls being received.

Furthermore, customer communications with businesses have expanded beyond the simple telephone and now involve a full range of electronic media, such as electronic mail, facsimile, and Internet interaction. Telephone call center systems are simply not designed nor equipped to process or manage the diverse electronic media and data with which customers and businesses can remotely interact. Accordingly, telephone call center systems cannot capture all the electronic data associated with a multimedia transaction in which the customer utilizes all the media resources available to fulfill a transaction. Nor, therefore, can the telephone call center effectively monitor the full range of media formats by which customers and businesses can effect communications. Similarly, the call center cannot dynamically respond to changing conditions within the center such that the recording of critical communications data is automatically adjusted and appropriate call center personnel are notified so as to maintain a desired level of service quality.

SUMMARY OF THE INVENTION

The preferred embodiments of the present invention overcome the problems associated with existing systems for monitoring, selectively recording, and analyzing telephone call center transaction data by providing the capability of dynamically changing the rules controlling the recording of all electronic and environmental data associated with every call directed to a call center. The present invention also provides access to this data via a wide area network (hereinafter referred to as "WAN"), including a private intranet and the Internet, thereby freeing monitors or supervisors from the necessity of using proprietary equipment and software and the physical constraints and proximity of the telephone call center. Furthermore, the invention can fully recreate to the monitor the call center environment as experienced by the customer and the agent during the course of the telephone call.

An object of the present invention is to automate the process by which the electronic data associated with the operation of a contact center is selectively recorded and analyzed. The data is recorded and stored on mass storage devices based on an active set of recording rules. The environmental characteristics of the contact center are monitored and regularly stored by the system. Periodically, the recorded communications data and stored environmental data is analyzed by the system. Based on the analysis, the set of recording rules that is actively controlling the recording of the communication data may be changed by the system. Also as a result of the analysis, displayed messages may be projected onto contact center-wide displays, agent workstation displays, and supervisor workstation displays. The displayed information may range from daily contact center statistics, to a warning that a incoming call queue has an excessive wait time, to a congratulatory message to an agent who has exceeded a particular contact center performance standard.

The present invention is directed to a multimedia contact center, including a communication receiving unit receiving multimedia communication data at the contact center; a rules-based recording unit storing the received multimedia communication data; an evaluation unit analyzing the stored multimedia communication; and a rules editor changing the recording rules based on the analysis by the evaluation unit.

The present invention is also directed to a method for monitoring contact center activity, including recording data associated with one or more communications with the contact center, wherein the recording is based on an active set of one or more pre-determined recording rules; evaluating environmental data associated with the contact center against predetermined data; and automatically changing the active set of recording rules based on the evaluation.

The present invention is further directed to a quality monitoring interface accessing contact center information, including a multimedia recording device recording data associated with a contact center communication; a database storing the recorded multimedia data; an analyzer evaluating the recorded multimedia data; and a display displaying the results of the analyzer.

The present invention is additionally directed to a method for rules-based recording of information at a communications contact center, including recording environmental data associated with the operation of a contact center based on an active set of recording rules; storing the recorded environmental data in a historical database; periodically analyzing the stored environmental data to determine historical queue states; comparing the recorded environmental data against the historical queue states; and implementing a new set of active recording rules upon detecting a change in the queue state based on the comparison.

The present invention is also directed to a method for displaying contact center information, including recording data associated with one or more communications with a contact center, wherein the recording is based on one or more recording rules; comparing the recorded data against predetermined contact center parameters; displaying messages to contact center personnel, reporting contact center activity as compared against the parameters; and storing said displayed messages.

BRIEF DESCRIPTION OF THE DRAWINGS

These and other objects and advantages of the present invention will become more apparent and more readily appreciated from the following description of the preferred embodiments, taken in conjunction with the accompanying drawings, of which.

DESCRIPTION OF THE PREFERRED EMBODIMENTS

Figure 1:
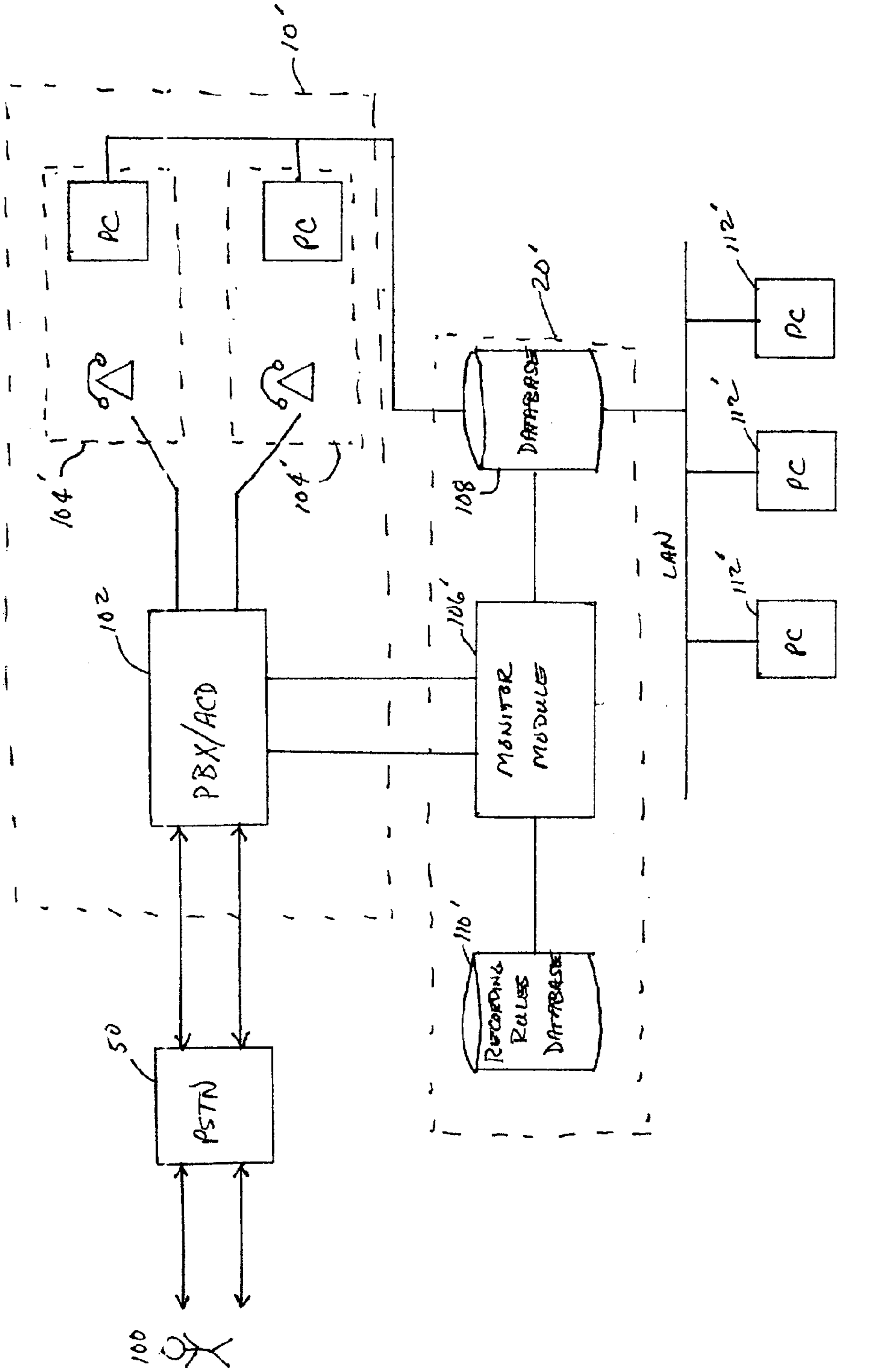
FIG. 1 is a block diagram of a prior art telephone call center.
Figure 2:
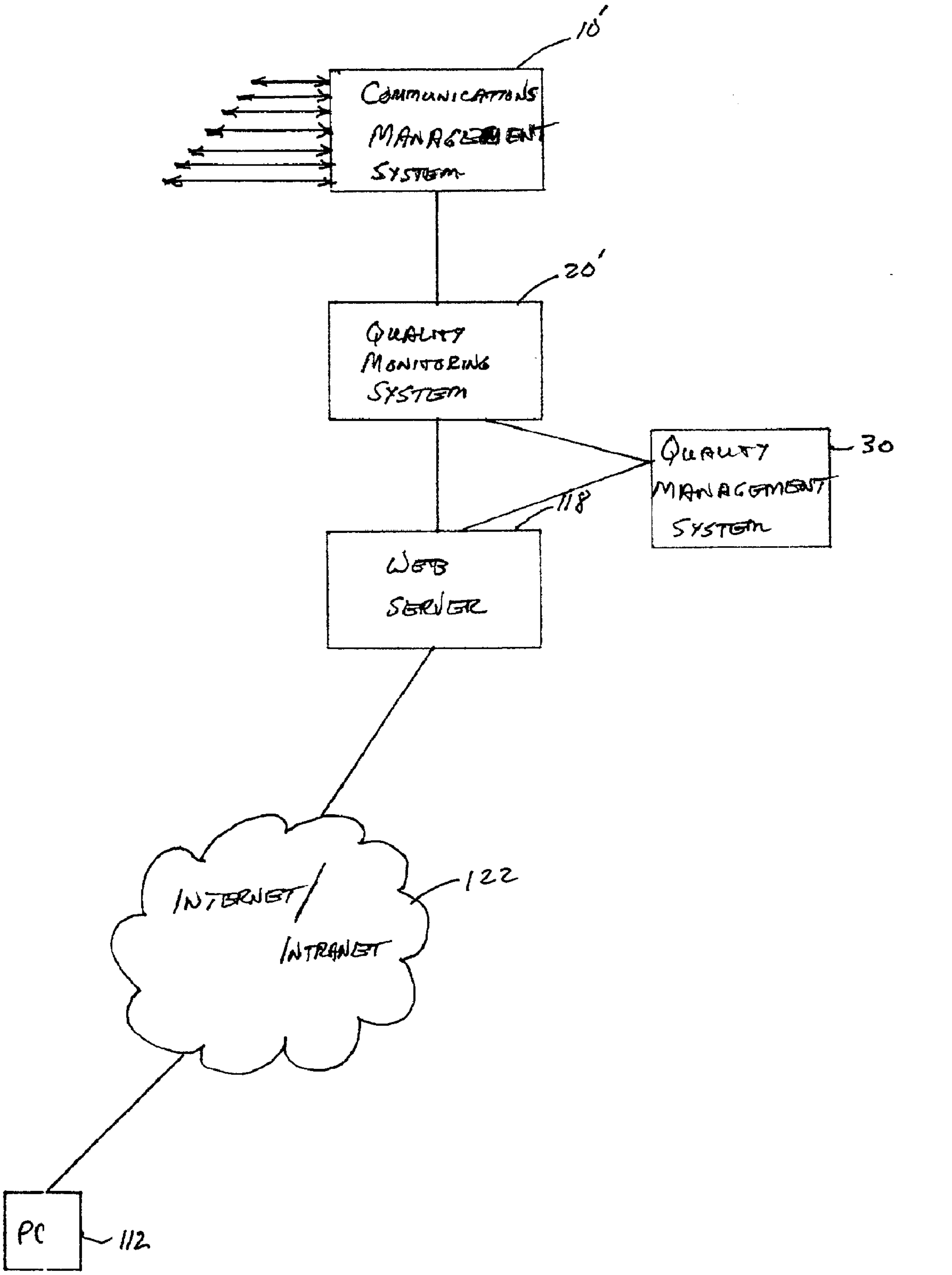
FIG. 2 is a subsystem block diagram of an embodiment of the quality monitoring and management system of the present invention.

Referring initially to FIG. 2, a system layout of the present invention is shown. Contact center communications from customers and to customers are routed to, and emanate from, the communications management system 10. These communications are not limited to telephone calls and can be one, or any combination, of known mechanisms for conveying information, such as telephone calls, video images, electronic mail messages, facsimile transmissions, web interactions, and data transmissions. All electronic data associated with the communications is routed to the quality monitoring system, 20, where the data is selectively recorded based on an active set of recording rules drawn from a recording rules database (not shown). The "active" set of rules consist of those rules from the recording rules database that are currently in use and controlling the selective recording of communications data. A quality management system 30 periodically analyzes the recorded communications data along with environmental data of a contact center. Although not shown in FIG. 2, the results of the data analysis includes routing messages to various displays of users and personnel within and remote from the contact center and dynamically altering the active set of recording rules of the quality monitoring system 20. A user operating a communications device 112, such as a personal computer, across a wide area network 122 interfaces with a web server 118 to selectively access, analyze, and play back the communications data.

Figure 3:
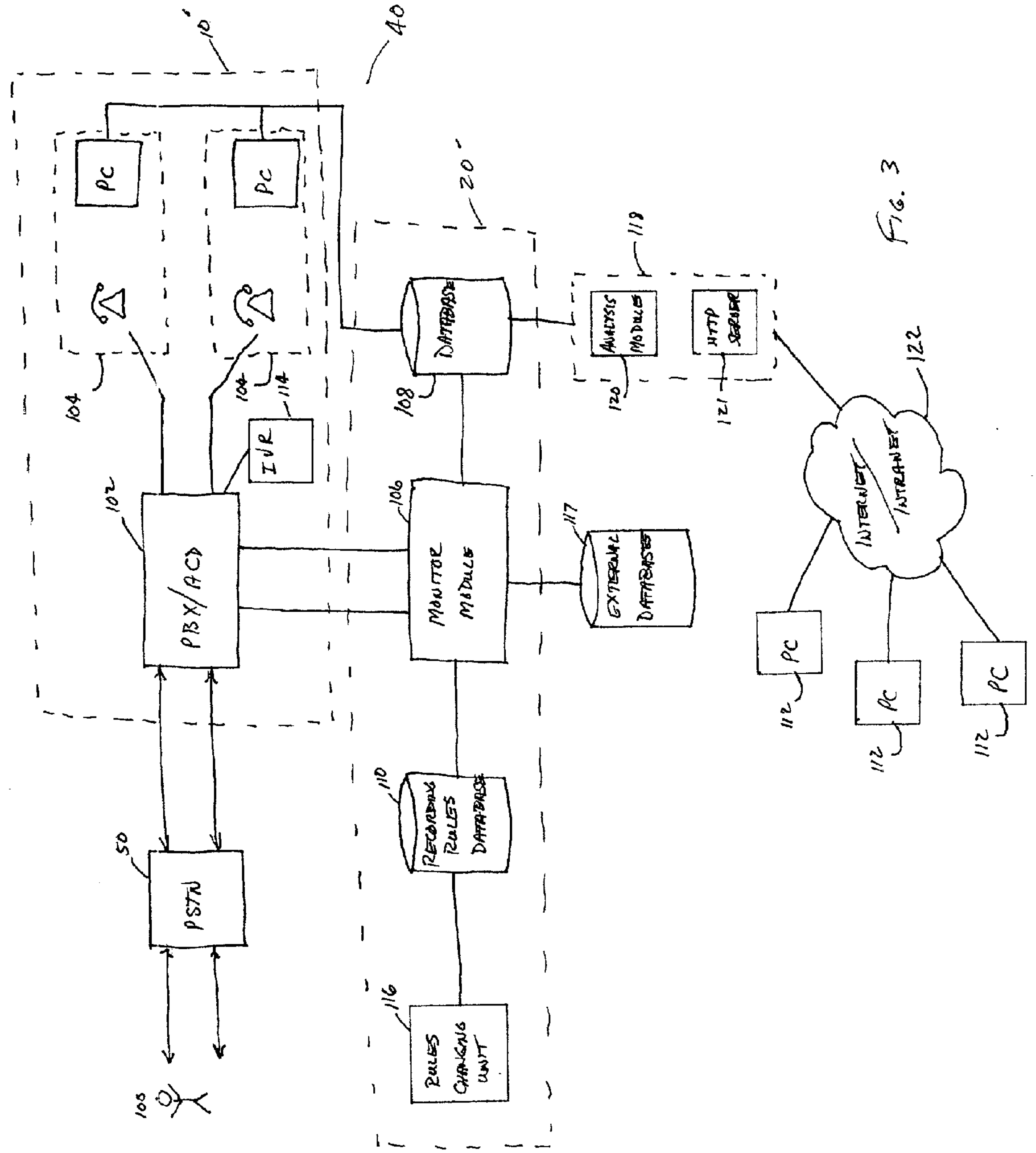
FIG. 3 is a block diagram of an embodiment of a communications management and quality monitoring system of the present invention, utilized to effect communications between customers and a contact center and to store data associated with the communications.

Referring to FIG. 3, the communications management system 10 of the present invention provides for the processing of incoming and outgoing communication of a contact center 40, such as a telephone call center. Customers 100 access the contact center through a network 50. The automatic call distribution system (PBX/ACD) 102 directs the communication to the computer/telephone workstation 104 of a contact center agent based on the availability of the agent. In those contact centers handling communications for a number of different clients, communications to a particular client may be routed to a finite group of agents specifically trained to respond to the needs of the customers of that client. Alternatively, the PBX/ACD 102 may include an interactive voice response (IVR) system 114 that presents an audible menu to the customer, requesting a response by means of the customer's telephone key pad or voice, and directing the call to a particular group of agents or to a particular information retrieval system, based on the responses of the customer. For example, the system can provide the customer 100 the address to which products should be returned, or the Internet address for obtaining additional product information. The PBX/ACD 102, the IVR 114, and the workstation 104 comprise the communications management system 10 of FIG. 2.

All data associated with the customer's communication and the agent's responsive interaction with the customer are selectively recorded by the monitor module 106. Examples of the data that can be recorded by the system include the audio and video data from both the customer and the agent; video images of the contact center and the agent during the communication; e-mail and facsimile messages between the customer and the agent; keypad data input by the customer; screens viewed by the agent; web interaction data for any Internet communication during the transaction; start and end time for the customer's communication; identity of the customer, including the originating telephone number and the call-in telephone number; identity of the various agents servicing the communication; length of time the customer is on hold; and the steps the customer navigated through before ending the communication. The system utilizes automatic number identification (ANI) to extract information regarding the identity of the calling party and dialed number identification service (DNIS) to obtain the phone number the calling party has dialed. The in-dialed phone number is used to identify to the agent the client, promotion, or information that the customer is seeking. This capture of information can also include recording conversations to capture the verbal part of the transaction and digital recording of the agent's display during and after the conversation with-the customer. In those cases where communication between the customer and the agent is effected by electronic mail, the content of the e-mail is captured and recorded along with the e-mail addresses of the sender and the recipient. The recording of the data is controlled at the monitor module 106 by the rules maintained in the rules database 110.

Contact center administrators have access to the rules changing unit 116 to modify the conditions under which various calls are recorded and the data recorded for each such call. Also, as more thoroughly discussed below regarding FIG. 4, the data analyzer 400 can invoke the rules changing unit 116 to dynamically change the active set of recording rules. All incoming and outgoing calls can be recorded in their entirety; particular calls can be identified for recording, such as by particular clients or agents; and calls can be recorded by event, such as calls exceeding a particular length. Calls can also be recorded by characteristic, such as recording all calls directed to a particular client, as identified with DNIS. The recorded data is referred to as "cradle-to-grave" information in that all information related to a particular communication or transaction is recorded, from the time the call enters the contact center 40 to when the caller terminates the call. All of the interactions during the call are recorded, including interaction with the IVR system, time spent on hold, data keyed through the caller's key pad, conversations with the agent, video images of the customer or the agent, and screens displayed by the agent at his/her workstation 104 during the transaction. These types of recordings allow for evaluation of the complete customer experience during the interaction of the transaction. As an example, the length of time a customer was on hold during a purchase transaction can be analyzed as a possible detraction from completing a purchase or as an indication that more agents are needed. Such information may be used by contact center personnel to modify their procedures, staffing, and/or equipment to improve the customer experience using the contact center 40. The comprehensiveness of the data capture of the present invention also allows for the subsequent verification of transaction content. For example, a dispute over what information was verbally provided by a caller applying for insurance coverage over the telephone can easily be resolved by replaying the application call in its entirety. Whether a customer selected size 13 can also be proven, as can whether the customer/investor authorized the purchase of 100 shares of a particular stock. The monitor module 106, database 108, recording rules database 110, and rules changing unit 116 comprise the quality monitoring system 20 of FIG. 2

The dynamic recording system of the present invention provides a broadly available doorway to a full range of electronic data recorded during the operation of a contact center 40, such as a telephone call center. As used herein, the term, "contact center," refers to a telephone call center that provides all of the aforementioned services and additionally provides information and analysis of the operation and utilization of the center facilities. The contact center is capable of recording, processing, and analyzing multimedia transactions involving electronic data including voice, video, graphical user interface screens, electronic mail, facsimile, and web interactions. While the traditional telephone call center monitors and may record audio data and customer key pad entries, the present invention has the capability of recording the multitude of electronic data formats that represent the interaction that may occur between a customer and a contact center agent during fulfillment of a customer-agent transaction. For example, customers can access the present invention's contact center via "Voice over IP," whereby the customer is speaking and hearing through the microphone and speakers, respectively, of the customer's personal computer instead of the traditional telephone. Additionally, the customer and the agent can engage in two-way video and audio conferencing with PC cameras. The present invention can capture all of this communication data, including the video of the transaction between the customer and the agent.

The digital and analog data associated with the contact center transactions to be recorded are captured by a multimedia transaction monitor module 106, which stores by data type on any one or more of well known data storage media, such as disk drives or optical disks, included in the contact center database 108. Pertinent data associated with each transaction is also stored in the system's database 108. For example, the date and time of the transaction; customer, agent, and contact center identification; and location of the recorded transaction on the mass storage media. As discussed below, the database 108 may also store the environmental data captured by the environmental recording unit 452, as captured during the time duration of each recorded communication. The communication, transaction, and environmental data is time-stamped so that the various data types can be matched in time for subsequent synchronization and review.

The data of database 108 is selectively input into an analysis module 120 based on a user's query from workstation 112. The results of the analysis are returned to the workstation 112 of the user. In the case where the user is accessing the contact center across the Internet, the selected transaction and environmental data output from the analysis module 120 is encoded into a universally accepted compression format by an encoder for streaming to an Internet browser on the user's workstation 112.

Contact center monitors, supervisors, clients, and third party reviewers (hereinafter collectively referred to as "users") alike can access the communication information via the Internet for recreation of the entire communication/transaction. Contact center clients therefore have the ability to directly evaluate communications made by their customers and to distribute these communications within their respective organization for further evaluation and review. As a result of the present invention, access to contact center transactional data is no longer limited by the number of monitor workstations 112' connected to the system because, with the present invention, any number of Internet-accessible users with proper authorization and a multimedia playback browser can query the data anytime, from anywhere.

A key feature of the present invention is the ease of remote access to the data by users. The user is no longer restricted to the proprietary equipment and software of a telephone call center to conveniently and economically access the full wealth of information that is recorded and subsequently made available for review and analysis by the present open storage portal operating with the communication contact center. The user has the option of selecting particular transactions to review, such as all calls for a particular client, for a particular product, to a particular agent, during a particular time frame, etc. In this manner, the users have web-based browser access to the full range of contact center data from anywhere in the world and are not constrained by a requirement for proprietary hardware and software in network proximity to the contact center.

Figure 4:
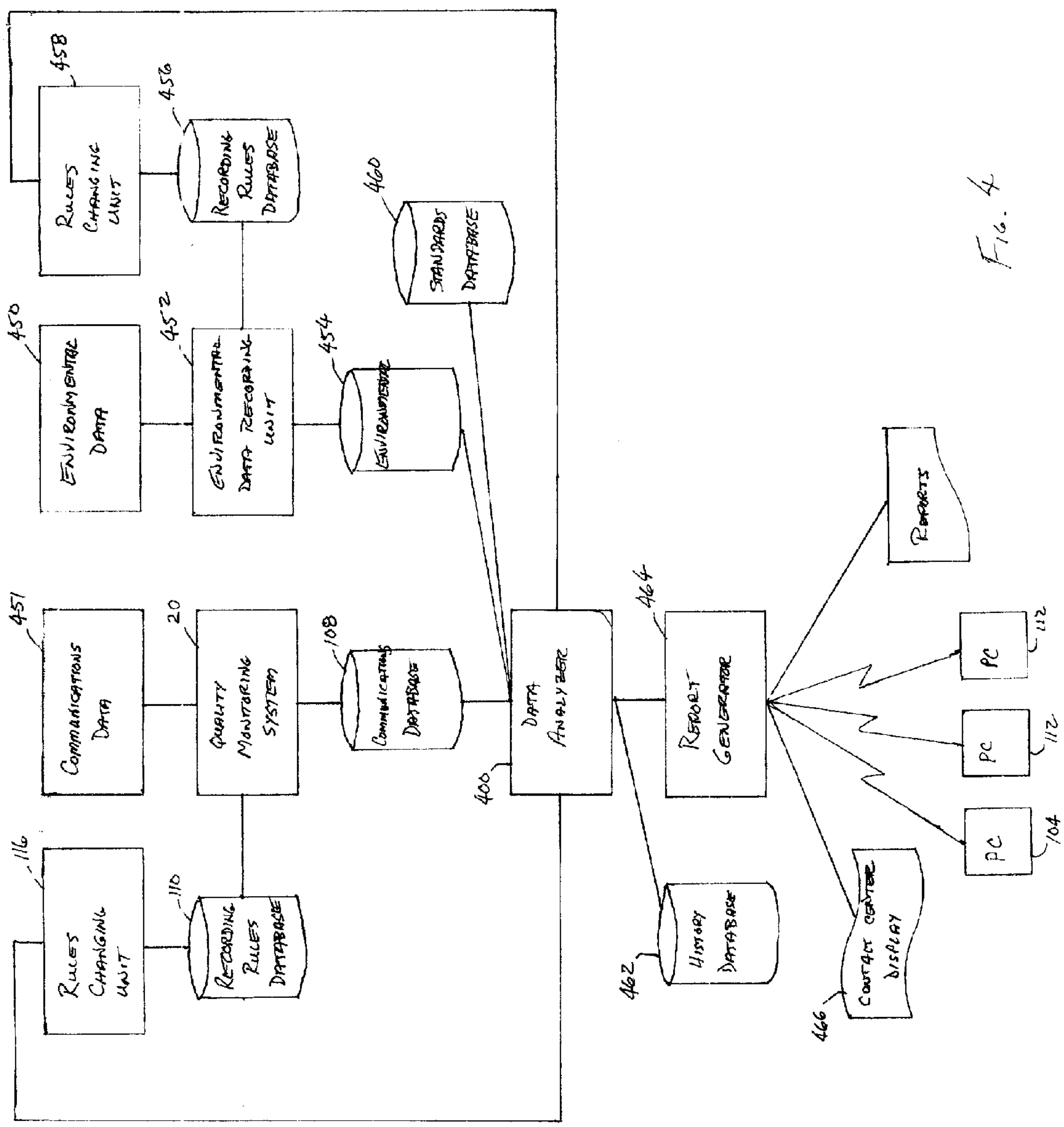
FIG. 4 is a flow chart of an embodiment of the quality management system of the present invention, in which communications data and environmental data are captured and analyzed, with reports and displayed messages being generated.

Referring now to FIGS. 3 and 4, the quality management system 30 of the contact center 40 will be discussed. A key element oft he quality management system 30 is the data analyzer 400, which periodically inputs communications transaction data 451 from database 108 and environmental data 450 associated with the operation and status of the contact center 40. As discussed above, the quality monitoring system 20 selectively records communications data 451 into the database 108. A unique aspect of the present invention is the inclusion of non-transactional data in the form of contact center environmental data 450 in the data analyzer 400 of the quality management system 30. By including data associated with the environmental conditions of the contact center 40, the present invention can evaluate the conditions, past and present, within the contact center 40 and can implement changes and messages to contact center personnel so as to improve the quality of the operation of the contact center 40. The system can also utilize the environmental data 450 to dynamically change the active set of recording rules controlling the recording of the communications data 451 and those rules determining which environmental data 450 is recorded.

The environmental data recording unit 452 receives environmental data 450 from throughout the contact center 40. This data includes queue state information, such as the number of calls waiting to be answered in each of the various incoming queues, the number of customers on hold, and the average wait time per queue before a customer can contact an agent. The data also includes the temperature and humidity at the agents' workstations 104, the noise levels within the contact center 40, the number of idle agents, and the profiles of the agents present in the contact center 40. Some of this data is recorded by event. In other words, for example, each time an agent terminates a communication with a customer, a record is created noting that the particular agent has completed a customer transaction and is idle. Some of the environmental data 450 is recorded on a periodic basis. For example, the state of all of the incoming communication queues can be recorded every thirty seconds. However, when the contact center is busy, some of this data should be recorded more frequently, which the present invention can accomplish automatically as explained more thoroughly below. Initially, however, the recording of the environmental data 450 is controlled by a subset of the recording rules residing in the recording rules database 456. The subset of environmental data recording rules that is actually in use is termed the active set of recording rules. Authorized personal have access to the rules changing unit 458 for modifying the recording rules in the database 456 and for changing the active set of recording rules. Additionally, as discussed below, the data analyzer 400 can dynamically alter the active set of recording rules for environmental data 450. Although FIG. 4 shows databases 108 and 454 being separate, the communications data 451 and the environmental data 450 could reside in a common database. Similarly the recording rules for the communications data 451 and and the environmental data 450 could reside in a common database.

On a periodic basis, as determined by the contact center management, the data analyzer 400 inputs communications data 451 and the environmental data 450 from their respective databases 108 and 454. The data analyzer 400 has two primary functions; a reporting process and recording rules management. As regards the reporting process, the data analyzer 400 gleans agent performance information from the data and compares the performance of each agent against a predetermined set of standards and goals for agents as maintained in the contact center's standards database 460. The standards database 460 can have a single set of standards applicable to all contact center agents and can also have individualized standards for each agent. For every agent who is performing below their corresponding standards, the data analyzer 400 generates and routes a message to the workstation of the appropriate supervisor for that agent within the contact center 40 to so advise the supervisor. Consistent with the multimedia capabilities of the present invention, this communication to the supervisor can be effected through e-mail, facsimile, and the Internet. The data analyzer also generates a summary record of the event for storage in the history database 462. Optionally, the data analyzer 400 can route a message for display on the agent's workstation 104 to inform the agent of his/her performance level as compared to the contact center's standards. On the other hand, if the agent's performance has exceeded the standards, or if the agent has achieved a particular goal, such as processing his/her $10,000^{th}$ transaction, the system can issue a congratulatory message that can appear on the agent's display, the supervisor's display, and also on a contact center-wide display 466. In this manner, the entire contact center 40 can automatically be informed of an agent's exemplary performance, thus serving to motivate the contact center personnel. Also, the data analyzer 400 can glean information from the communications data 451 for each agent and display on each agent's display relevant performance information for that agent. For example, the top if line of each agent's display could show the transactions completed during the agent's shift or month-to-date, the elapsed number of minutes/hours online with the current customer, and the number of calls waiting in queue for that agent or that agent's group. The data analyzer 400 can also route this agent information to the supervisor's display for viewing.

The data analyzer 400 processes all environmental data 450 that has been stored by the environmental data recording unit 452 since the data analyzer 400 last processed data. The data analyzer 400 analyzes the environmental data 450 as isolated data, as compared to historical environmental data retained by the system in the history database 462, and as compared to contact center standards as maintained in the standards database 460. The results from the analysis can be output by the report generator 464 in the form of reports. These reports include both detail and summary information regarding the environmental statistics associated with activity at the contact center 40. For example, the reports can list the temperature and humidity at various agents' workstations 104 across time. Similarly, the reports can chart queue activity and queue wait periods across a selectable time frame. By comparing the new environmental data 450 against the historical environmental data from the history database 462, the data analyzer can identify and report trends, such as increasing wait time in particular queues or diminishing idle time on the part of the agents. The data analyzer 400 can also route summary information through the report generator 464 to a contact center-wide display 466 for viewing by all contact center personnel, to agent workstations 104, and to monitor or supervisor workstations 112. The information displayed could be performance and statistical information such as the number of calls received so far that date, the cumulative total minutes/hours online with customers so far that date, the number of calls waiting in each queue, the number of agents idle, and the total dollar value of the transactions completed that date.

By comparing the environmental data 450 against the contact center standards, the data analyzer can detect contact center conditions that management may want to address. To that end, the data analyzer 400 can detect out of standard conditions and can report the conditions to contact center management by directing appropriate messages to management displays. For example, the system could detect when the number of customers waiting in incoming queues exceeds a predetermined threshold and so notify management. Similarly, if average customer time on hold exceeds an acceptable value, the system could send an appropriate message to management. Also, all of these warning messages or alerts could also be directed to the contact center-wide display 466 for viewing by all contact center personnel. Similarly, because of the web server 118 capabilities of the present invention, the reporting facilities of the present invention are available to users across a wide area network, including the Internet.

As regards the recording rules management portion of the function of the data analyzer 400, the data analyzer 400 can automatically and dynamically (in real time) implement a new set of active recording rules for capturing both the communications data 451 and the environmental data 450. Upon detecting a threshold condition in either the communications data 451 or the environmental data 450, or detecting a particular trend in the data as compared to the historical data in the history database 462, the data analyzer 400 can instruct rules editor 116 or 458, respectively, to deactivate specific active recording rules and to activate different recording rules from the recording rules databases 110 and 456, respectively. The change in the active set of recording rules can be effected immediately or can be delayed until a particular time. For example, if the data analyzer 400 detects that the number of calls being processed by the contact center 40 has increased significantly, the data analyzer could correspondingly increase the frequency by which the environmental data 450 is recorded each hour. If a problem call is detected by a voice stress analysis of a conversation between a customer and an agent or detection of a swear word in an active conversation between a customer and an agent, the data analyzer 400 could trigger the recording of the call (communications data 451). If the noise level at the agent's workstation 104 exceeds a threshold, the data analyzer 400 could trigger the recording of all communications handled by that agent and a video recording of the agent. I.e., detecting a single environmental factor could trigger a recording rules change for both the communications data 451 and the environmental data 450. If the queue states for a particular agent or group of agents increase beyond a predetermined level, the data analyzer 400 could trigger the recording of all calls (communications data 451) directed to this agent or group of agents for subsequent analysis by a monitor or supervisor. In this manner, the present invention automatically and dynamically adjusts the recording of communications data 451 and environmental data 450 as the conditions in the contact center 40 change. The contact center management will then have sufficient relevant information with which to understand trends, determine why conditions changed, evaluate agent performance, and implement measures to maintain the quality of the contact center's performance. The rules change effected can be as simple as increasing the recording frequency of environmental data upon detection of a particular time of day or day of the week.

Transactions available to be fulfilled through the contact center 40 include the full range of telephone-initiated activities, from voice and e-mail messaging to information services to online ordering of products. The contact center 40 provides the apparatus and methodology in a single system for capturing, accessing, and analyzing all of the data associated with the customer-initiated and customer-authorized transactions. The advantage of recording this data 451 along with the contact center environmental data 450 is that the contact center 40 can dynamically and automatically adjust the recording of data for subsequent analysis and can display status and warning messages to contact center personnel for subsequent response. The monitor or supervisor, instead of merely reviewing the conduct of the agent, can now perceive the complete transaction as experienced by the customer 100 and the agent, including wait time, environmental characteristics of the contact center at the time of the call, and calls waiting in the queue at the start of and during the call.

Also, through the selective recording and the selective retrieval, analysis, and playback of contact center communications data 451, and environmental data 450, the user can now fully recreate the experience of both the customer and the agent during the call. With this information, the user can verify past transactions; monitor the performance of the agent for possible review and training; determine the effect that a'stressful environment in the contact center 40 may have on the ultimate results of a transaction; and perceive the results of equipment, staffing, and policy changes in the contact center 40. All of these effects can be accomplished conveniently and economically anywhere in the world, any time of day because of the wealth of information captured by the system, the analysis produced by the system, and the ease of access to both the raw transactional data of each communication and the analyzed results of contact center activity.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A multimedia contact center, comprising:

a communication receiving unit receiving multimedia communication data at a contact center;

a rules-based recording unit storing the received multimedia communication data;

an evaluation unit analyzing the stored multimedia communication; and a rules editor changing the recording rules based on the analysis by the evaluation unit.

2. A method for monitoring contact center activity, comprising:

recording data associated with a plurality of communications with the contact center, wherein the recording is based on a first set of contact center recording rules which regulate at least one of recording volumes, types of calls recorded and agents selected for recording;

evaluating environmental data associated with the contact center against predetermined data; and automatically and dynamically changing the first set of contact center recording rules based on the evaluation.

3. A quality monitoring interface accessing contact center information, comprising:

a recording device recording multimedia data associated with a contact center communication;

a database storing the recorded multimedia data;

an analyzer evaluating the recorded multimedia data to determine whether handling of contact center communication is above or below standards; and one or more display devices displaying one or more messages indicating whether the handling of the contact center communication is above or below the standards, wherein the analyzer determines the one or more messages to be displayed.

4. The quality monitoring interface according to claim 3, wherein the recording device records multimedia data comprising two or more of: video data of an exchange between a customer and a contact center agent; electronic mail data related to the communication; and facsimile data related to the communication.

5. The quality monitoring interface according to claim 3, wherein the recording device records multimedia data comprising two or more of: audio data of a conversation between a customer and a contact center agent; video data of an exchange between a customer and a contact center agent; web contact data regarding access to the contact center by a customer; video data of an agent, graphical user interface screen data used by an agent; electronic mail data related to the communication; facsimile data related to the communication; and key pad response data from a party initiating the communication.

6. The quality monitoring interface according to claim 3, wherein the analyzer, while evaluating the recorded multimedia data, compares the recorded multimedia data against predetermined contact center standards.

7. The quality monitoring interface according to claim 3, wherein the analyzer, while evaluating the recorded multimedia data, compares the recorded multimedia data against environmental data associated with the operation of the contact center.

8. The quality monitoring interface according to claim 3, wherein the display displays the results of the analyzer on one or more of: a workstation of an agent, a workstation of a supervisor, and a display device viewable within the contact center.

9. The quality monitoring interface according to claim 3, wherein the one or more display devices displays information including one or more of: present queue states; historical queue states; and agents whose performance has either exceeded or failed to meet contact center performance standards.

10. A quality monitoring interface accessing contact center information, comprising:

an environmental recording device recording environmental data associated with the operation of a contact center;

an agent data recording device recording information regarding the activity of a contact center agent within the contact center;

an analyzer comparing the recorded agent data against contact center performance standards; and a display device presenting agent performance as analyzed against the performance standards, wherein the analyzer adjusts the stored contact center performance standards based on the recorded environmental data prior to comparing the recorded agent data against the stored contact center performance standards.

11. A method for processing contact center information, comprising:

recording data associated with one or more communications with a contact center, wherein the recording of data is controlled by a first set of recording rules;

analyzing the recorded data and environmental data associated with the contact center against a predetermined set of standards established for the contact center; and dynamically changing the first set of recording rules as a result of the analysis.

12. A method for rules-based recording of information at a communications contact center, comprising:

recording environmental data associated with the operation of a contact center based on an active set of recording rules;

storing the recorded environmental data in a historical database;

periodically analyzing the stored environmental data to determine historical queue states;

comparing the recorded environmental data against the historical queue states; and implementing a new set of active recording rules upon detecting a change in the queue state based on the comparison.

13. A method for changing rules for the recording of communications data at a contact center, the rules regulating at least one of recording volumes, types of calls recorded and agents selected for recording, said method comprising:

determining at least one environmental factor of a contact center; and automatically and dynamically changing the recording rules based on the determined environmental factor.

14. The method for changing rules according to claim 13, wherein determining at least one environmental factor comprises determining one or more incoming queue lengths.

15. A computer readable medium encoded with software to change the rules for recording communications data at a contact center by determining at least one environmental factor of a contact center and automatically and dynamically changing the recording rules based on the determined environmental factor, the recording rules regulating at least one of recording volumes, types of calls recorded and agents selected for recording.

16. A recording rules changing apparatus for the recording of communications data at a contact center, comprising:

a decision unit determining at least one environmental factor of a contact center; and a rules changer automatically and dynamically changing the recording rules based on the determined environmental factor, the recording rules regulating at least one of recording volumes, types of calls recorded and agents selected for recording.

17. A method for displaying contact center information, comprising:

recording data associated with one or more communications with a contact center, wherein the recording is based on one or more recording rules;

comparing the recorded data against predetermined contact center parameters to determine whether handling of the one, or more communications is above or below standards corresponding to the predetermined contact center parameters;

displaying messages to contact center personnel, reporting contact center activity as compared against the parameters to indicate whether the handling of the one or more communications is above or below the standards; and storing said displayed messages.

18. The method for displaying contact center information according to claim 17, further comprising recording environmental data associated with the operation of the contact center.

19. The method for displaying contact center information according to claim 18, wherein displaying messages to contact center personnel comprises displaying contact center environmental data to at least one contact center supervisor.

20. A computer readable medium encoded with software to record data associated with one or more communications with a contact center, wherein the recording is based on an active set of one or more pre-determined recording rules; to record environmental data associated with the contact center; to evaluate the recorded environmental data against predetermined standards established for the contact center; and to automatically change the active set of recording rules based on the evaluation.

21. A quality monitoring interface accessing contact center information, comprising:

a recording device recording multimedia data associated with a contact center communication;

a database storing the recorded multimedia data;

an analyzer evaluating the recorded multimedia data; and one or more display devices displaying one or more messages, wherein the analyzer determines the one or more messages to be displayed, wherein the recording device records multimedia data comprising two or more of: video data of an exchange between a customer and a contact center agent; electronic mail data related to the communication; and facsimile data related to the communication.

* * * * *

UNITED STATES PATENT AND TRADEMARK OFFICE
CERTIFICATE OF CORRECTION

PATENT NO. : 6,959,078 B1
APPLICATION NO. : 09/490065
DATED : October 25, 2005
INVENTOR(S) : Robert Eilbacher et al.

It is certified that error appears in the above-identified patent and that said Letters Patent is hereby corrected as shown below:

Column 12, Line 54, after “display” insert --devices--.

Column 14, Line 16, change “one,” to --one--.

Signed and Sealed this

Sixth Day of February, 2007

JON W. DUDAS
*Director of the United States Patent and Trademark Office*